Dec. 25, 1934.  V. F. REA  1,985,742

SPOOL STRUCTURE

Filed March 26, 1934

Victor F. Rea  INVENTOR.

BY

H. G. Burns  ATTORNEY.

Patented Dec. 25, 1934

1,985,742

UNITED STATES PATENT OFFICE 1,985,742

SPOOL STRUCTURE

Victor F. Rea, Fort Wayne, Ind., assignor to Rea Magnet Wire Company, Inc., a corporation of Indiana Application March 26, 1934, Serial No. 717,405

6 Claims. (Cl. 242—123)

This invention relates to improvements in spool structures and the object thereof is to provide a spool upon which to accumulate wire in coil formation, designed in such manner as to be susceptible to its production economically as in the process of die casting, and wherein the entire spool structure including its cylinder and complemental parts are integral. Another object is to afford a rigid spool structure for accumulation thereon of wire preferably constituted so that its various parts are formed integrally in such manner as to obviate assemblage operations in its manufacture. Other objects and advantages of the invention will appear in the following description.

An illustrative embodiment of the invention is shown in the accompanying drawing, in which:—

Figure 1:
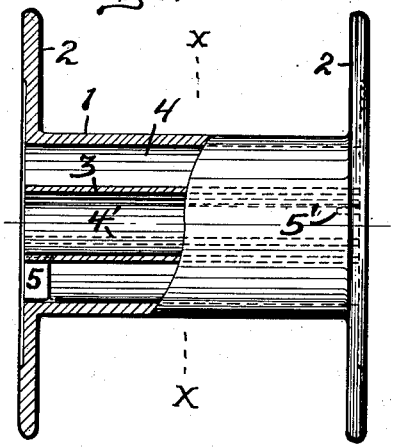
Fig. 1 is a side elevation of a spool structure in which the invention is embodied, a portion thereof being cut away.
Figure 2:
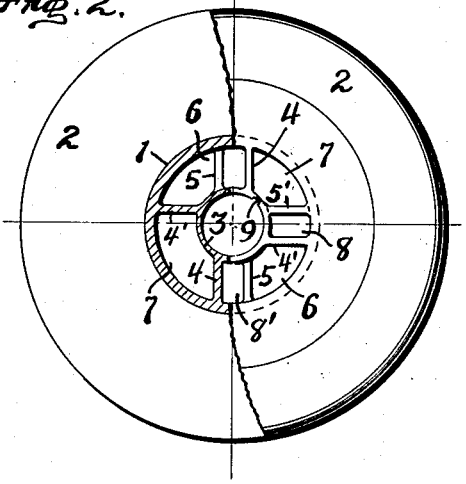
Fig. 2 is an end elevation projected from Fig. 1, a portion thereof being in section on the line x—x thereof.
Figure 3:
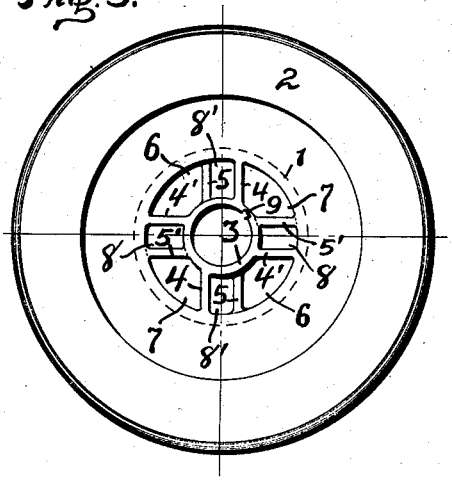
Fig. 3 is an end elevation of the spool structure.
Figure 4:
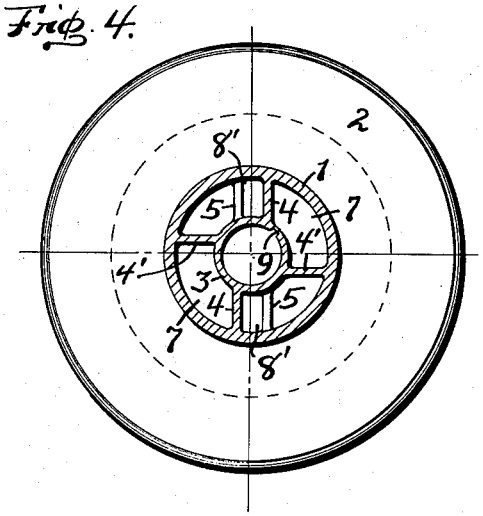
Fig. 4 is a cross section of Fig. 1 on the line x—x thereof.
Figure 5:
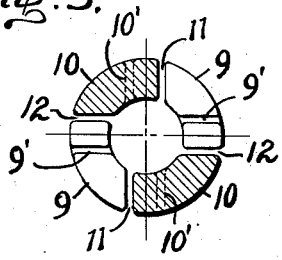
Fig. 5 is a diagram of a core used in the manufacture of the spool structure, constituted of members arranged in opposite pairs, one pair of members being in section.

The illustrative embodiment of the invention comprises a spool structure having a cylinder 1 provided at each end thereof with an external radially extending flange 2. Within the bore of the cylinder, in axial alinement therewith, is disposed a tubular hub 3 that extends substantially throughout the length of the cylinder. Preferably, the hub 3 is integrally connected with the cylinder by a series of webs 4—4' that are co-extensive longitudinally with the cylinder and the hub 3 and spaced apart from each other. The pair of webs 4 extend in planes parallel with each other and are located upon opposite sides of the axis of the hub, and the pair of webs 4' are disposed in parallel planes that extend at right angles to the planes of the webs 4 and are likewise located with respect to each other upon opposite sides of the axis of the hub.

At the ends of the spool the cylinder and hub are integrally connected by corresponding spokes 5—5' that extend respectively in planes substantially parallel with their complemental webs, there being one spoke to each web. The spokes 5 are located at one end of the spool and the spokes 5' are located at the opposite end thereof, so that the spaces 6 between the webs are at one end of the spool unobstructed, and the spaces 7 at the opposite end of the spool are likewise unobstructed.

By spacing the spokes 5 apart from their complemental webs 4 and similarly spacing the spokes 5' apart from their complemental webs 4', corresponding restricted openings 8—8' are provided at the ends of the spool suitably for reception of the dog-pin of a spindle (not shown) when the spool is mounted thereon to be rotated. The openings for the dog-pin are radially elongated to accommodate dog-pins of different throw but are restricted as to width so that when the spool is mounted on the spindle and the dog-pin projects into one of the openings lost rotative motion between the spindle and spool is prevented. Also, the hub preferably has an internal key-seat 9 made longitudinally therein for the reception of the key of a spindle (not shown) when splined relation between the hub and the spindle is desired.

The location of the spokes 5 in the spaces 6 at one end of the spool structure, and the location of the spokes 5' in the spaces 7 at the opposite end of the structure admits of forming the entire spool structure of an unitary casting and permits withdrawal of core members 9 and 10 from within the spaces 6 and 7 respectively through the corresponding opposite ends of the spool structure without obstruction by the spokes.

Each of the core members 9 has made in one end thereof a channel 9' in which a corresponding one of the spokes 5' is formed during the casting operation, and each core member 10 has in its end opposite to that of the channeled ends of the members 9 a similar channel 10' in which is formed the corresponding spoke 5 as the structure is cast. The core members 9 and 10 are positioned in a suitable mold (not shown) as in the usual practice of die casting, and are spaced apart to provide channels 11—12 in which the corresponding webs 4—4' are formed during the casting operation.

Upon removal of the core members 9 and 10 from the formed structure the spokes and webs are left intact in the body casting. In this manner is economically produced a complete spool structure including its supporting hub and connections between said hub and the spool cylinder in an unitary formation that is light in weight and of great strength and rigidity.

I claim:—

1. A spool structure including a cylinder provided with radially extending external end flanges, a tubular hub located in the bore of said cylinder in axial alinement therewith and extending substantially throughout the length thereof, a series of webs spaced apart from each other connecting the hub and cylinder and which are co-extensive longitudinally therewith, said webs being arranged in pairs, one pair of said webs being disposed in planes parallel with each other upon opposite sides of the axis of the hub, and the other pair of webs being arranged in parallel planes at right angles to the planes of the other pair of webs and located with respect to each other upon opposite sides of said axis, and spokes connecting said cylinder and hub at each end of the spool structure complemental to the webs of each pair thereof and spaced therefrom to provide restricted dog-pin openings, the spokes complemental to one pair of webs being located at the end of the spool oppositely with respect to the spokes complemental to the other pair of webs.

2. A spool structure including a cylinder provided with radially extending external end flanges, a tubular hub located in the bore of said cylinder in axial alinement therewith and extending substantially throughout the length thereof, a series of webs spaced apart from each other connecting the hub and cylinder that are co-extensive longitudinally therewith, and spokes connecting said cylinder and hub at each end of the spool structure complemental to said webs, the spokes being spaced from the corresponding webs to provide restricted dog-pin openings, the complemental spoke for each web being located at the end of the spool oppositely with respect to the spoke complemental to the adjacent web.

3. A spool structure including a cylinder provided with radially extending external end flanges, a tubular hub located in the bore of said cylinder in axial alinement therewith and extending substantially throughout the length thereof, a series of webs spaced apart from each other connecting the hub and cylinder that are co-extensive longitudinally therewith, and means located at each end of the spool structure between the cylinder and hub adjacent certain of said webs to provide radially elongated laterally restricted openings for the reception of a dog-pin.

4. A spool structure including a cylinder provided with radially extending external end flanges, a tubular hub located in the bore of said cylinder in axial alinement therewith and extending substantially throughout the length thereof, a series of webs spaced apart from each other integral with and connecting the hub and cylinder that are co-extensive longitudinally therewith, and spokes located at each end of said structure adjacent certain of said webs.

5. A spool structure including a cylinder provided with radially extending external end flanges, a tubular hub located in the bore of said cylinder in axial alinement therewith, a series of webs connecting the hub and cylinder, and means located at each end of the spool structure providing radially elongated laterally restricted openings for the reception of a dog-pin.

6. A spool structure constituted of a single casting shaped to form a cylinder with end flanges, a tubular hub extending axially within the cylinder, webs spaced apart from each other extending longitudinally with respect to the axis of the structure connecting said cylinder and hub, and means in each end of said structure to provide a radially elongated laterally restricted opening for the reception of a dog-pin.

VICTOR F. REA.